UNITED STATES PATENT OFFICE.

JEHU H. WOOD, OF LEBANON, OHIO.

PROCESS OF UNITING GOLD AND VULCANITE.

SPECIFICATION forming part of Letters Patent No. 325,469, dated September 1, 1885.

Application filed June 17, 1885. (No specimens.)

*To all whom it may concern:*

Be it known that I, JEHU H. WOOD, of Lebanon, in the county of Warren and State of Ohio, have invented a new and Improved Process of Uniting Gold and Vulcanite, of which the following is a full, clear, and exact description.

Heretofore it has been deemed impracticable to obtain a satisfactory union between gold foil and vulcanite; but I have discovered a method or process by which such a union can be obtained.

This method or process consists, essentially, in the application of a solution of chloride of silver to the plastic gutta-percha or rubber prior to the application of the gold and to the vulcanization of the mass.

To carry my invention into effect I coat the surface of the plastic rubber with chloride of silver, which is applied little by little, by means of a brush or other proper implement, until the whole surface of the rubber to which the gold is to be united is whitened by the silver in the solution. The gold-foil is now put on and pressed down lightly, so as to conform to whatever irregularities there may be upon or in the surface of the rubber. After treating the plastic rubber as described, I place it in a vulcanizer and submit it to the ordinary process of vulcanization, after which process it will be found that a partial chemical union has taken place between the elements, whereby the gold and newly-formed vulcanite will constitute one integral mass made up of a surface of gold backed by a body of vulcanite. It will also be found that the chlorine will have been driven off or have been absorbed by the iron receptacle used in the process of vulcanization, so that the coating of the vulcanite will consist of pure gold and silver, the gold, of course, being on the outside.

The above is the preferred process for carrying my invention into effect; but I have found that by immersing rubber in a strong ammoniacal solution of chloride of silver it will take up and retain enough of the silver to cause an adhesion of the gold after vulcanization.

My invention is more particularly applicable to the formation of such plates as are used by dentists for the purpose of supporting and sustaining false teeth, and the invention meets a long-existing want in the profession, many efforts having been made within the past twenty years to line dental vulcanite plates with gold-foil, all of which, until my discovery, have proved futile, for the reason that the gold could not be made to adhere to the vulcanite.

A gold lining in a dental plate is very desirable, for the reason that gold will not injure the mucous membrane of the mouth, and heretofore, to obtain such a lining, it has been customary to use gold in such quantities that its fibers could be incorporated with the vulcanite, so as to take a mechanical hold thereon; but this method was very expensive, on account of the large amount of gold that necessarily had to be used.

Having thus described my invention, I claim as new and desire to secure by Letters Patent—

1. In the formation of gold-coated vulcanite, the application of chloride of silver, substantially as described.

2. The process of uniting gold and caoutchouc, which consists in coating the caoutchouc with chloride of silver, laying on the gold, and vulcanizing the mass, substantially as described.

JEHU H. WOOD.

Witnesses:
W. L. DECHAUT,
J. A. RUNYAN.